United States Patent
Voina et al.

(10) Patent No.: US 11,084,214 B2
(45) Date of Patent: Aug. 10, 2021

(54) THREE-DIMENSIONAL PRINTING BY POLYHEDRAL SHAPE APPROXIMATION

(71) Applicant: Océ Holding B.V., Venlo (NL)

(72) Inventors: Daniel S. Voina, Timisoara (RO); Violeta Iacob, Timisoara (RO); Dan M. Regep, Timisoara (RO)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 579 days.

(21) Appl. No.: 16/007,565

(22) Filed: Jun. 13, 2018

(65) Prior Publication Data

US 2018/0370138 A1    Dec. 27, 2018

(30) Foreign Application Priority Data

Jun. 21, 2017   (EP) .................................... 17177089

(51) Int. Cl.
   *B29C 64/30*      (2017.01)
   *G06T 19/00*      (2011.01)
   (Continued)

(52) U.S. Cl.
   CPC .............. *B29C 64/30* (2017.08); *B29C 53/04* (2013.01); *B29C 64/10* (2017.08); *B29C 64/386* (2017.08);
   (Continued)

(58) Field of Classification Search
   CPC ..... B29C 64/30; B29C 64/386; B29C 64/393; B29C 64/10; B29C 53/04; B29C 69/00;
   (Continued)

(56) References Cited

U.S. PATENT DOCUMENTS

| 5,838,332 A | * | 11/1998 | Penna | ...................... G06T 15/04 345/587 |
| 2002/0186216 A1 | * | 12/2002 | Baumberg | .............. G06T 17/20 345/422 |

(Continued)

FOREIGN PATENT DOCUMENTS

KR    20160003990 U  * 11/2016  ........... A23G 3/0268

OTHER PUBLICATIONS

Siegel, A.C., Phillips, S.T., Dickey, M.D., Lu, N., Suo, Z. and Whitesides, G.M., 2010. Foldable printed circuit boards on paper substrates. Advanced Functional Materials, 20(1), pp. 28-35. (Year: 2010).*

(Continued)

*Primary Examiner* — Rocio Del Mar Perez-Velez
*Assistant Examiner* — Alicia M. Choi
(74) *Attorney, Agent, or Firm* — Birch, Stewart, Kolasch & Birch, LLP

(57) ABSTRACT

In a method for providing a three-dimensional object, the method includes the steps of providing a representation of the three-dimensional object; determining a polygon mesh of a polyhedral resembling the object, wherein the polyhedral fits within the object; determining a surface difference between an outer surface of the object and an outer surface of the polyhedral; defining a relief layer corresponding to the polygon mesh based on said surface difference; instructing a printing assembly to provide the relief layer; and folding the relief layer in accordance with the polygon mesh to form the polyhedral resembling the three-dimensional object. Thus, using a printing assembly to print two-dimensional layers, a three-dimensional object may be provided or at least approximated.

11 Claims, 6 Drawing Sheets

(51) Int. Cl.
*G06T 17/20* (2006.01)
*B29C 64/386* (2017.01)
*B33Y 50/00* (2015.01)
*G06T 17/00* (2006.01)
*G06T 17/05* (2011.01)
*B33Y 10/00* (2015.01)
*B33Y 50/02* (2015.01)
*B29C 64/393* (2017.01)
*B29C 64/10* (2017.01)
*B29C 53/04* (2006.01)
*B29C 69/00* (2006.01)
*B29L 31/54* (2006.01)

(52) U.S. Cl.
CPC ............ *B29C 64/393* (2017.08); *B29C 69/00* (2013.01); *B33Y 10/00* (2014.12); *B33Y 50/00* (2014.12); *B33Y 50/02* (2014.12); *G06T 17/00* (2013.01); *G06T 17/05* (2013.01); *G06T 17/20* (2013.01); *G06T 19/00* (2013.01); *B29L 2031/54* (2013.01); *G06T 2219/021* (2013.01)

(58) Field of Classification Search
CPC ......... B33Y 10/00; B33Y 50/00; B33Y 50/02; G06T 17/00; G06T 17/05; G06T 17/20; G06T 19/00; G06T 17/10; G06T 2219/021; B29L 2031/54
See application file for complete search history.

(56) References Cited

U.S. PATENT DOCUMENTS

| | | | | |
|---|---|---|---|---|
| 2003/0191554 | A1* | 10/2003 | Russell | G06T 17/20 700/187 |
| 2011/0249048 | A1* | 10/2011 | Gullentops | B41C 1/003 347/5 |
| 2012/0320040 | A1* | 12/2012 | Algreatly | G06T 17/00 345/419 |
| 2014/0092439 | A1* | 4/2014 | Krig | G06T 9/001 358/2.1 |
| 2018/0011669 | A1* | 1/2018 | Ohtsuka | G06T 3/0031 |

OTHER PUBLICATIONS

Chen et al., "Encore: 3D Printed Augmentation of Everyday Objects with Printed-Over, Affixed and Interlocked Attachments," UIST '15, Nov. 8-11, 2015, Charlotte, NC, USA, pp. 73-82.
European Search Report issued in EP 17 17 7089, dated Sep. 1, 2017.
Mueller et al., "WirePrint: 3D Printed Previews for Fast Prototyping," UIST '14, Oct. 5-8, 2014, Honolulu, HI, USA, pp. 273-280.
Olberding et al., "Foldio: Digital Fabrication of Interactive and Shape-Changing Objects with Foldable Printed Electronics," UIST '15, Nov. 8-11, 2015, Charlotte, NC, USA, pp. 223-232.
Song et al., "Printing 3D objects with interlocking parts," Computer Aided Geometric Design 35-36 (2015), pp. 137-148.
Teibrich et al., "Patching Physical Objects," UIST '15, Nov. 8-11, 2015, Charlotte, NC, USA, pp. 83-91.

* cited by examiner

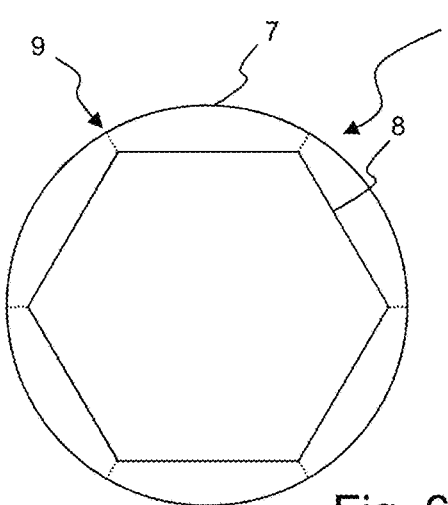
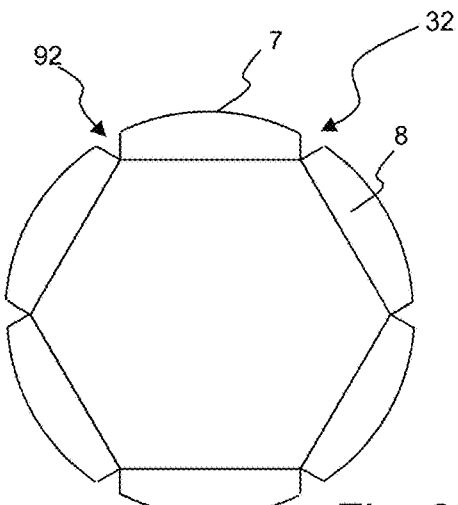
Fig. 6A
Fig. 6C
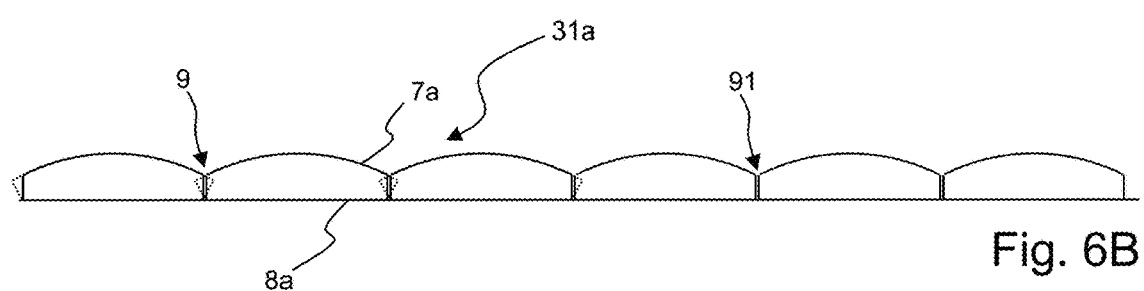
Fig. 6B
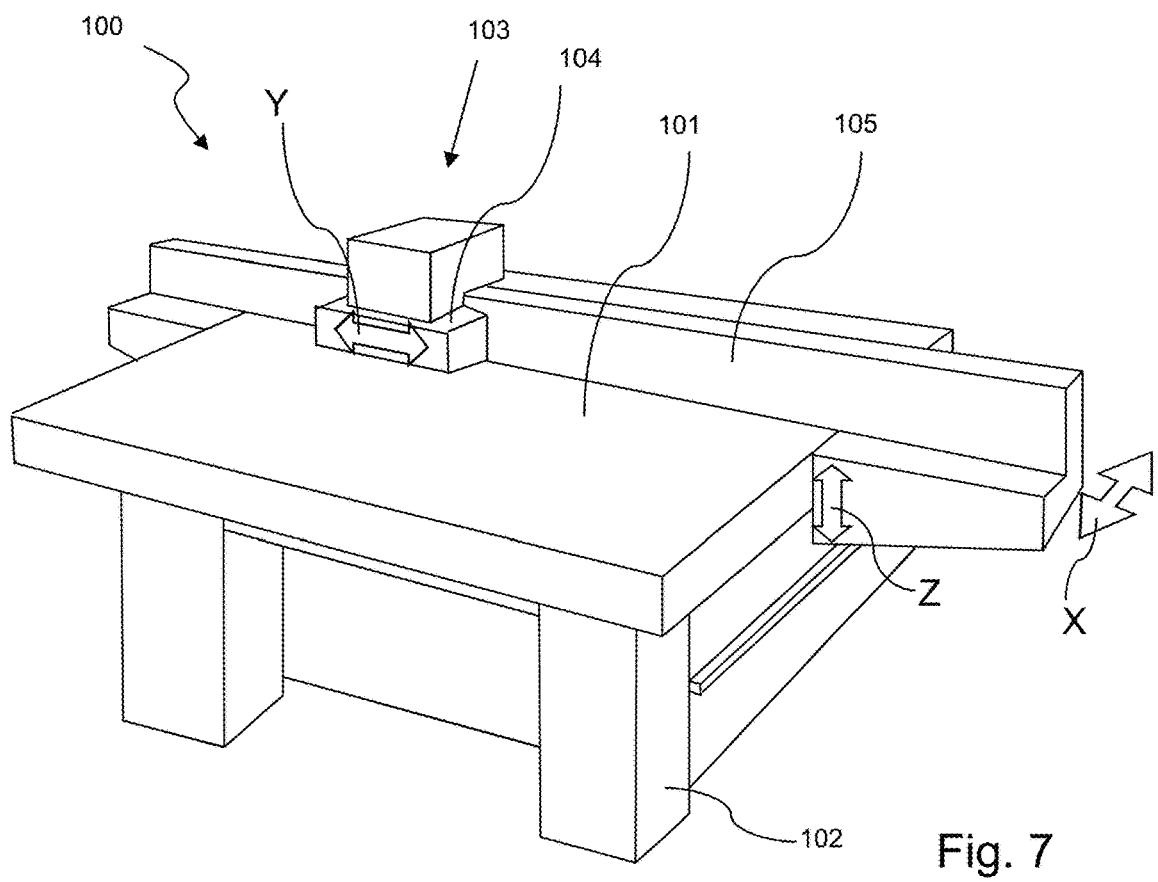
Fig. 7

THREE-DIMENSIONAL PRINTING BY POLYHEDRAL SHAPE APPROXIMATION

FIELD OF THE INVENTION

The present invention generally pertains to generating three-dimensional objects.

BACKGROUND ART

It is known to represent three-dimensional objects by using a polygon mesh. A polygon mesh is a collection of vertices, edges and faces that define a polyhedral object, wherein the polyhedral object may be used instead of or representing another shape. A well-known example is a leather ball made of a number of pentagonal (commonly black) and hexagonal (commonly white) pieces of leather stitched together to form a spherical shape.

While the above-mentioned leather ball may be smoothly curved due to the flexibility of the leather pieces and the gas pressure in the ball, other objects and shapes formed by a polyhedral have the sharp folding lines and flat faces therebetween.

It is an object of the present invention to improve a smoothness of a three-dimensional object formed by a polyhedral.

SUMMARY OF THE INVENTION

In an aspect of the present invention, a method according to claim 1 is provided. The method according to the present invention comprises the steps of providing a representation of the three-dimensional object; determining a polygon mesh of a polyhedral resembling the object, wherein the polyhedral fits within the object; determining a surface difference between an outer surface of the object and an outer surface of the polyhedral; defining a relief layer corresponding to the polygon mesh based on the surface difference; instructing a printing assembly to provide the relief layer; and folding the relief layer in accordance with the polygon mesh to form the polyhedral resembling the three-dimensional object.

Smoothness of an outer surface of the resulting three-dimensional object may be improved by removing the flatness of the faces of the polyhedral. Thereto, a surface difference between a polyhedral shape formed from the polygon mesh and a desired three-dimensional object may be determined and translated into a relief layer. The relief layer is a two-dimensional unfolded representation of the polyhedral (i.e. corresponding to the polygon mesh) having thickness differences representing the surface difference between the polyhedral shape and the three-dimensional object. The relief layer may be printed on a printing assembly that is enabled to provide such a relief layer. After printing such a relief layer and folding the relief layer into the polyhedral shape, a relief is provided on the faces of the polyhedral shape which improves the smoothness of the resulting outer surface of the three-dimensional object formed by the polyhedral shape. It is noted that determining or selecting or defining a polyhedral shape representing a three-dimensional object and determining or defining a polygon mesh corresponding to the polyhedral is well-known in the art. For example, in computer graphics, it is common to represent and handle three-dimensional digital objects by a polyhedral formed by a polygon mesh. In computer graphics, polygon meshes are thus extensively used. The polygons used may be only triangles or may comprise triangles, quadrilaterals and other polygons. Many algorithms for determining or defining suitable polygon meshes are available to a person skilled in the art. In view of the common availability of such algorithms and their use and applications, determining of suitable polygon meshes is believed to be within the ambit of the skilled person and is therefore not further elucidated herein.

In view of the fact that the printing assembly is only suited to add a recording substance to increase a height of a relief (i.e. an additive process), the polyhedral needs to be formed within an outer surface boundary of the three-dimensional object such that the relief layer has a thickness which may be generated by the use of a printing assembly. It is however contemplated that subtractive processing means could be used as well within the concept of the present invention (i.e. applying a relief/height profile to the polygon faces of a polyhedral shape), although such subtractive processing is outside the scope of the appended claims.

In an embodiment, the polygon mesh comprises a first polygon and a second polygon, wherein the second polygon is adjacent to the first polygon such that the first polygon and the second polygon have a common boundary line and wherein the relief layer is defined taking into account the common boundary line between the first polygon and the second polygon such to enable folding of the relief layer along the common boundary line. In order to fold the polygon mesh to the desired polyhedral shape, the polygon mesh needs to be folded along common boundaries between the polygons of the polygon mesh. However, with an increased height and corresponding thickness of the relief layer, folding may become difficult and cumbersome, if at all reasonably possible, which will depend on the kind of substance is used for providing the relief layer, e.g. in view of hardness, brittleness, flexibility, elasticity, and the like. These aspects may be taken into account when defining the relief layer. In a particular embodiment, for example, a void may be defined in the relief layer at the position of the common boundary line. Thus, the substance forming the relief layer will not obstruct folding of the polygons along their common boundary lines.

In an embodiment, the polyhedral is determined to have the common boundary line of the first polygon and the second polygon to lie on the outer surface of the three-dimensional object. With the common boundary line on the outer surface of the three dimensional object, no height will be needed at the boundary line. Without a need for providing an increased height, no substance needs to be provided on the boundary line and, consequently, folding will not be obstructed.

In an embodiment, the step of instructing the printing assembly comprises generating a multi-layer print data set, wherein the multi-layer print data set comprises print data for printing multiple layers, wherein the multiple layers form the relief layer. Providing an increased height in accordance with the desired relief layer is enabled by applying multiple layers of a substance on top of each other. To instruct and control the operation of the printing assembly, the relief layer is divided in multiple layers defined in a multi-layer print data set. The multi-layer print data set may then be provided to the printing assembly such that the printing assembly may provide for the relief layer by applying the multiple layers on top of each other.

In an embodiment, the method further comprises the steps of defining an inverse relief layer based on the relief layer and the surface difference; instructing the printing assembly to first provide the inverse relief layer and to provide the relief layer on the inverse relief layer; and removing the inverse relief layer to obtain the relief layer. In this embodiment, voids and height differences may be provided on either side of the relief layer. Constructing a material layer over a void in an additive process, in particular in three-dimensional printing, is generally and commonly made possible by first providing an inverse relief layer. The relief layer is then provided by applying the substance forming the relief layer on the inverse relief layer and, where desired, providing a relief on an opposing side by suitably controlling the printing assembly. It is noted that the inverse relief layer may be a sacrificial layer or may be a re-usable mold, or the like.

In an embodiment, the method further comprises a step of providing a foldable medium in the printing assembly for providing the relief layer on the medium, wherein the step of folding the relief layer comprises folding the medium with the relief layer. The relief layer may be formed by the substance supplied through the printing assembly or the substance may be applied on a medium. The medium may be a sheet of paper, plastics, metal and the like. Preferably the medium is at least foldable. In a particular embodiment, the medium may be flexible, elastic and the like, depending on the properties that are desired for obtaining the resulting polyhedral shape. The medium may be provided with a relief layer on one side or a relief layer may be provided on both sides of the medium. In another particular embodiment, the medium may be a relatively hard material having folding lines at the boundaries of the defined polygon mesh. For example, a relatively thick piece of cardboard may be incised with folding grooves at the location of the polygon boundaries of the defined polygon mesh. A representation of the defined polygon mesh may have been provided to a cutting assembly. Based on the representation, the cutting assembly may have been instructed and controlled to provide the grooves in the cardboard (or any other relatively hard or stiff medium) by cutting or milling to enable folding. Thereafter, the printing assembly may be instructed and controlled to apply the relief layer on top of the pre-cut cardboard medium.

In an embodiment, the method comprises cutting the medium in accordance with a circumference of the polygon mesh. Thus, the polygon mesh may be separated from a part of the medium that is not needed for forming the polyhedral shape. After cutting the medium to release the polygon mesh, the polygon mesh may be folded to provide the polyhedral shape.

In another aspect, the present invention provides a printing control unit comprising a processor and a processor-readable medium comprising a set of processor-executable instructions, wherein the set of processor-executable instructions comprises instructions for the processor to receive a representation of a three-dimensional object; determine a polygon mesh of a polyhedral resembling the three-dimensional object, wherein the polyhedral fits within the three-dimensional object; determine a surface difference between an outer surface of the three-dimensional object and an outer surface of the polyhedral; and define a relief layer corresponding to the polygon mesh based on the surface difference. Thus, the printing control unit is configured to perform the method according to the present invention and in particular to generate the polygon mesh and its relief layer in accordance with the concept of the present invention, which comprises using a relief/height profile to the polygon faces of a polyhedral shape to more closely represent a smooth three-dimensional object.

In a further aspect, the present invention provides a printing assembly for providing a three-dimensional object, wherein the printing assembly comprises a printing device configured for providing a recording substance on a print surface in multiple layers and wherein the printing assembly comprises the printing control unit according to the present invention. The printing control unit is further configured to generate a multi-layer print data set, wherein the multi-layer print data set comprises print data for printing multiple layers, wherein the multiple layers form the relief layer; and instruct the printing device to provide the relief layer by printing the multiple layers defined by the multi-layer data set. Thus, a printing assembly configured to perform the method according to the present invention is provided.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein:

FIG. 6A shows a cross-section of a circular object;

FIG. 6B shows a cross-section of a polygon mesh generated in accordance with the present invention and intended to be folded into a polyhedral representing the circular object of FIG. 6A;

FIG. 6C shows a cross-section of the polyhedral folded from the polygon mesh of FIG. 6B;

FIG. 7 shows a perspective view of an embodiment of a printing assembly configured in accordance with the present invention.

DETAILED DESCRIPTION OF THE DRAWINGS

Figures 1A, 1B, 1C:
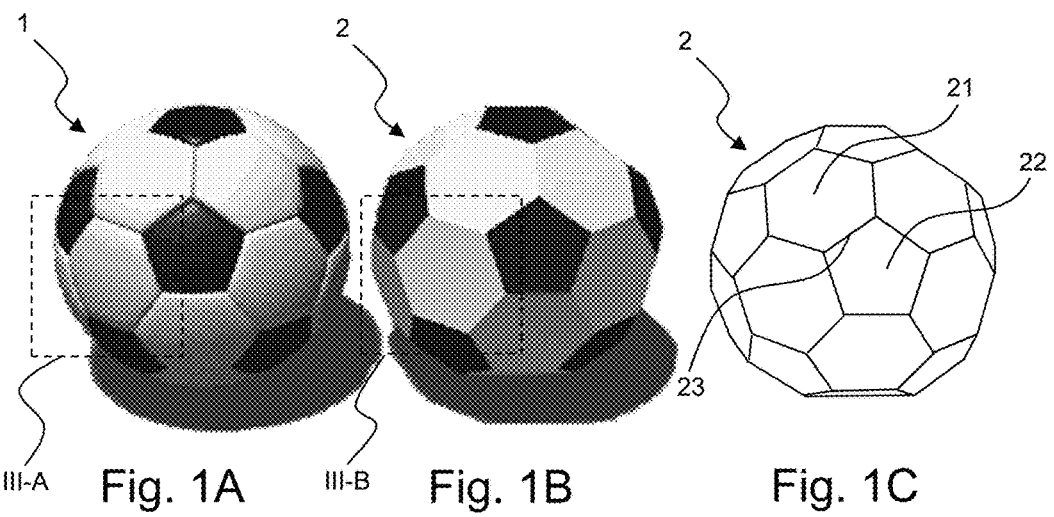
FIG. 1A shows a perspective view of a leather ball.
FIG. 1B shows a perspective view of a polyhedral resembling the leather ball of FIG. 1A.
FIG. 1C shows a perspective view of the polyhedral of FIG. 1B without color and shading.

The present invention will now be described with reference to the accompanying drawings, wherein the same reference numerals have been used to identify the same or similar elements throughout the several views.

FIG. 1A shows a common leather ball 1 formed from pieces of leather. White pieces have a regular hexagonal shape, i.e. a hexagon, and black pieces have a regular pentagonal shape, i.e. a pentagon. Edges of the leather hexagons and pentagons are stitched together in a predetermined pattern. An inner space is filled with pressured air, due to which the hexagonal and pentagonal polygons bulge outward and provide a rounded face. A round ball 1 is thus obtained.

FIG. 1B and FIG. 1C show a polyhedral 2 formed from hexagons 21 and pentagons 22 corresponding to the hexagons and pentagons of the ball 1 of FIG. 1A. The polygons 21, 22 are connected at a common boundary line 23. Faces of the hexagons and pentagons are flat. Thus, although an outer surface of the polyhedral 2 is not as smooth and rounded as an outer surface of the ball 1, the polyhedral 2 resembles the ball 1 and—depending on the application—may be considered an alternative for a ball.

Figure 1D:
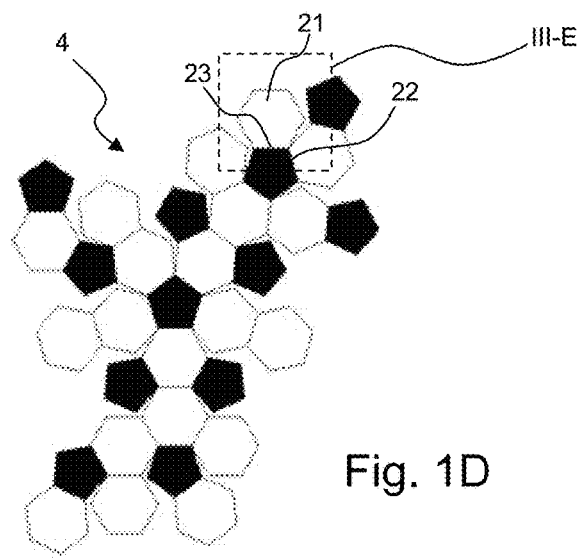
FIG. 1D shows a polygon mesh corresponding to the polyhedral of FIGS. 1B and 1C.

FIG. 1D shows a polygon mesh 4. The polygon mesh 4 is a flat structure composed of multiple polygons, wherein the polygons 21, 22 are arranged such that—when suitably folded and/or stitched at their common boundary lines 23—they form a polyhedral shape or polyhedral structure. In this case, the polygon mesh 4 may be folded and stitched to form the polyhedral shape 2 as shown in FIGS. 1B and 1C.

Figures 2A, 2B, 2C:
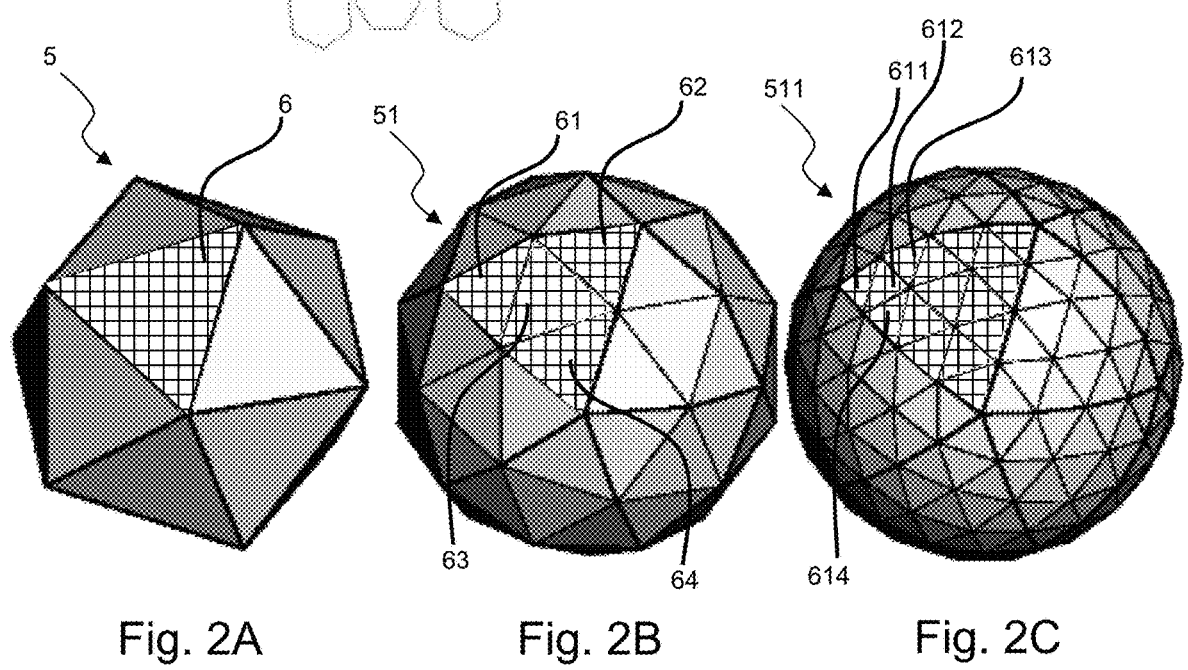
FIG. 2A shows a perspective view of a first embodiment of a polyhedral composed of triangles resembling a ball shape.
FIG. 2B shows a perspective view of a second embodiment of a polyhedral composed of triangles resembling a ball shape.
FIG. 2C shows a perspective view of a third embodiment of a polyhedral composed of triangles resembling a ball shape.

FIG. 2A shows another embodiment of a polyhedral 5 resembling a ball. The polyhedral 5 is composed of relatively large triangular faces 6. A rough approximation of a ball shape is thus obtained. FIG. 2B shows yet another embodiment of a polyhedral 51 resembling a ball shape. As compared to the polyhedral 5 of FIG. 2A, the polyhedral 51 of FIG. 2b is composed of medium sized triangular faces. In particular, the triangular face 6 is divided into four smaller triangular faces 61, 62, 63 and 64. Due to the smaller sized triangular faces, the polyhedral 51 more closely approximates the ball shape. Still, further decreasing the size of the triangular faces further improves the shape as shown in FIG. 2C. The polyhedral 511 shown in FIG. 2C is composed of even smaller triangular faces. In particular, compared to the polyhedral 51 of FIG. 2B, the triangular face 61 is divided in four triangular faces 611, 612, 613 and 614. Depending on the desired accuracy of the approximation, these triangular faces 611-614 may be divided into four even smaller triangles, and so on.

As illustrated by FIGS. 1A-1D and 2A-2C, using polygons, a three dimensional object like a ball shape may be resembled or approximated. The polygons may be part of a flat polygon mesh prior to being formed into the polyhedral shape. In a flat state, the polygons may be easily printed on by a common printing assembly. Thus, it is enabled to provide a polyhedral provided with a printed outer surface.

The inventors of the present invention have considered that the possibility to print on the polygon faces of the polyhedral structure provides an opportunity to improve the smoothness, e.g. roundness, of the polyhedral shape by applying a relief layer on the polygon faces as is elucidated hereinbelow.

Figure 3A:
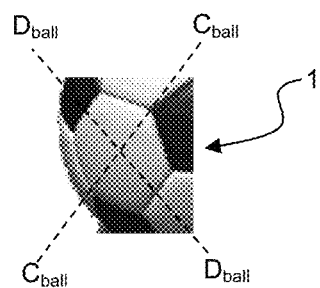
FIG. 3A shows a part of the leather ball of FIG. 1A.

FIG. 3A shows a part III-A (FIG. 1A) of the leather ball 1 and in particular a white hexagon. A cross-sectional profile along line $C_{ball}$-$C_{ball}$ is shown in FIG. 3C. A cross-sectional profile along line $D_{ball}$-$D_{ball}$ is shown in FIG. 3D.

Figure 3B:
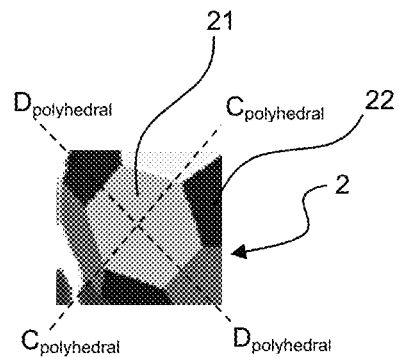
FIG. 3B shows a part of the polyhedral of FIGS. 1B and 1C.
Figure 3C:
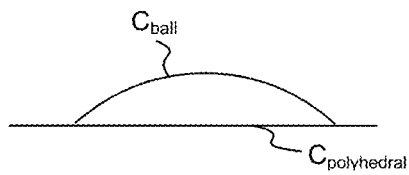
FIG. 3C shows a cross-sectional profile of the parts of FIGS. 3A and 3B along line C-C.
Figure 3D:
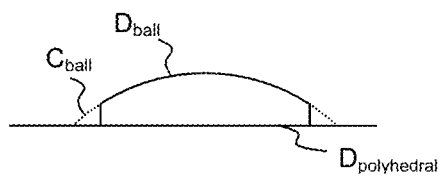
FIG. 3D shows a cross-sectional profile of the parts of FIGS. 3A and 3B along line D-D.

FIG. 3B shows a part III-B (FIG. 1B) of the polyhedral 2 and in particular a white hexagon 21 that corresponds to the white hexagon of the ball 1 shown in FIG. 3A. A cross-sectional profile along line $C_{polyhedral}$-$C_{polyhedral}$ is shown in FIG. 3C. A cross-sectional profile along line $D_{polyhedral}$-$D_{polyhedral}$ is shown in FIG. 3D.

Figure 3E:
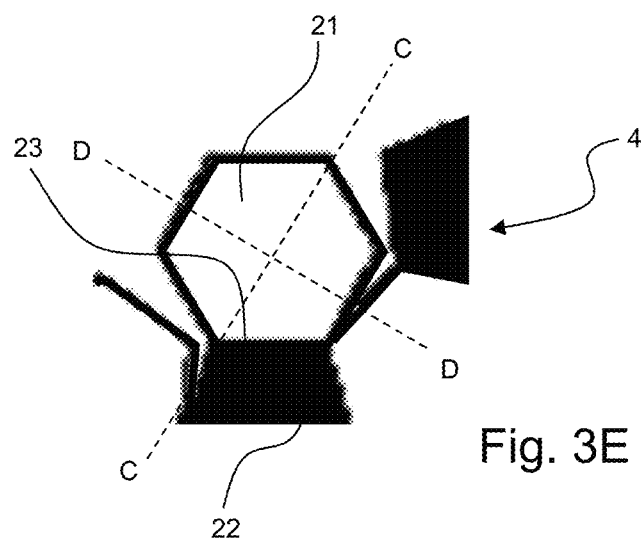
FIG. 3E shows a part of the polygon mesh of FIG. 1D.

FIG. 3E shows a part III-E (FIG. 1D) of the polygon mesh 4 and in particular a white hexagon 21. Line C-C corresponds to the lines $C_{ball}$-$C_{ball}$ and $C_{polyhedral}$-$C_{polyhedral}$; line D-D corresponds to the lines $D_{ball}$-$D_{ball}$ and $D_{polyhedral}$-$D_{polyhedral}$.

Turning to FIG. 3A, the hexagon is bulged due to the pressured air inside the ball 1. A height profile along line $C_{ball}$-$C_{ball}$ from a first corner of the hexagon to an opposite second corner of the hexagon is rounded as shown in FIG. 3C by a first ball profile $C_{ball}$, while a height profile of the polyhedral 2 along line $C_{polyhedral}$-$C_{polyhedral}$ is flat as shown in FIG. 3C by a first polyhedral profile $C_{polyhedral}$. Along this line C-C, the first ball profile $C_{ball}$ coincides with the first polyhedral profile $C_{polyhedral}$ at the corners of the hexagon. Turning to FIG. 3B and still considering that the hexagon is bulged due to the pressured air inside the ball 1, a height profile along line $D_{ball}$-$D_{ball}$ from a middle of a common boundary line of the hexagon to a middle of an opposite common boundary line of the hexagon is rounded as shown in FIG. 3D by a second ball profile $D_{ball}$, while a height profile of the polyhedral 2 along line $D_{polyhedral}$-$D_{polyhedral}$ is flat as shown in FIG. 3D by a second polyhedral profile $D_{polyhedral}$. Along this line D-D, the second ball profile $D_{ball}$ does not coincide with the second polyhedral profile $D_{polyhedral}$ at the common boundary line of the hexagon due to the difference in roundness and straightness of the hexagon boundaries.

In both FIGS. 3C and 3D it is apparent that the flat faces of the polyhedral 2 differ in height from the rounded and smooth faces of the ball 1. In order to better approximate the round and smooth outer surface of the ball 1, the polyhedral profiles $C_{polyhedral}$ and $D_{polyhedral}$ of the faces of the polyhedral 2 should approximate more closely the ball profiles $C_{ball}$ and $D_{ball}$, respectively. Therefore, it is the insight of the present inventors to determine the height differences between the hexagon of the ball 1 and the hexagon 21 of the polyhedral 2, which differences are described in relation to FIGS. 3A-3D, preferably for the whole surface of the hexagon 21 and other polygons. Having determined the height differences, these height differences may be applied to the polygon mesh 4 of FIGS. 1D and 3E e.g. by using a printing assembly that is enabled and configured to apply a relief layer in a pattern of the polygon mesh 4.

Figure 4A:
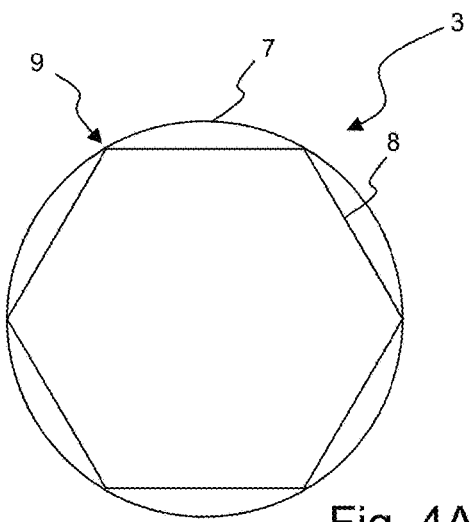
FIG. 4A shows a cross-section of a first embodiment of a circular object generated in accordance with the present invention.

FIG. 4A shows a cross-section of a circular three-dimensional object 3 having a smooth rounded outer surface 7 and an inner polyhedral. Faces 8 of the polyhedral are connected at a common boundary line 9, where the flat faces 8 are arranged under an angle.

Figure 4B:
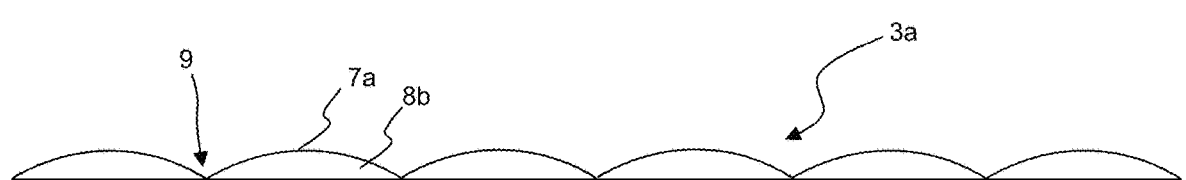
FIG. 4B shows a cross-section of a first embodiment of a polygon mesh suitable for forming the circular object of FIG. 4A.
Figure 4C:
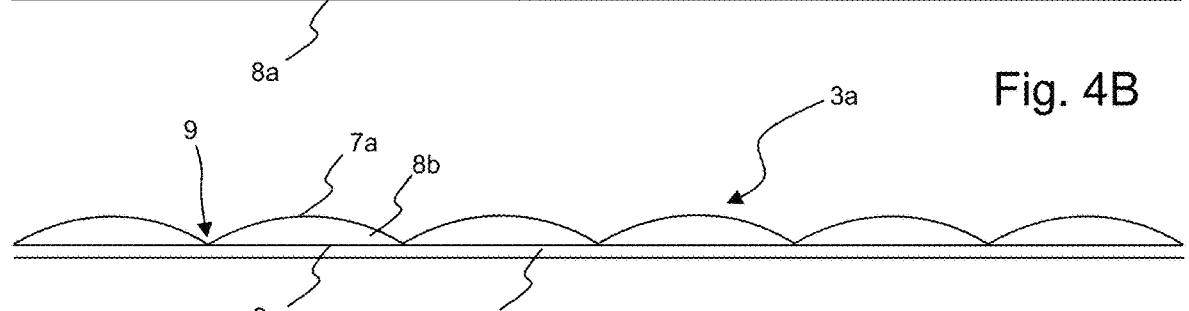
FIG. 4C shows a cross-section of a second embodiment of a polygon mesh suitable for forming the circular object of FIG. 4A.

FIG. 4B shows a cross-section of a first embodiment of a polygon mesh 3a suitable for providing the circular three-dimensional object 3 of FIG. 4A. The polygon mesh 3a comprises flat polygons 8a with a relief layer 8b for providing a locally elevated and rounded outer surface 7a. This first embodiment may be formed by application of a curable ink by a suitable printing assembly in a pattern of a suitable polygon mesh. For example, a UV-radiation curable ink may be used. In this embodiment, the cured ink needs to have sufficient flexibility to be bent at the common boundary lines 9 of the polygons 8a. FIG. 4C illustrates a second embodiment, in which a medium 10 is used as a base layer on top of which a relief layer 8b is provided, e.g. by printing. In this embodiment, the medium may provide for flexibility for bending, while the relief layer 8b may be discontinuous at the common boundary line 9 to enable and allow bending of the medium 10.

It is noted that the medium 10 may be a plastic foil or a metal foil or may be a paper sheet or card board or any other suitable material. Still, the medium 10 may have been printed on the same printing assembly as well. For example, a first type of ink may have been used for printing the medium 10 and a second type of ink may have been used for providing the relief layer 8b, wherein the first type of ink provides for suitable flexibility of the medium 10 for bending, while the second type of ink provides for suitable properties for the relief layer 8b.

Figure 4D:
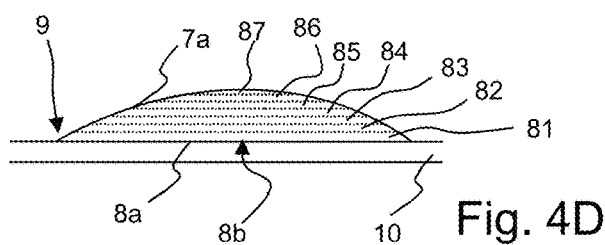
FIG. 4D shows a cross-section of a polygon of the polygon mesh of FIG. 4C.

FIG. 4D shows in more detail how the second embodiment having the relief layer 8b on the medium 10 as a base layer may be obtained by use of a printing assembly. In the illustrated embodiment, the medium 10 is locally provided with seven ink layers 81-87, wherein each of the seven ink layers 81-87 has a predetermined thickness. For example, assuming the ink used is a curable ink, a first ink layer 81 is provided on the medium 10 at locations on the medium 10 corresponding to the height differences previously determined between the outer surfaces of the polygonal faces of the polyhedral and the outer surface of the desired three-dimensional object. After application, the first ink layer 81 is cured to a suitable extent. After curing the first layer 81, a second ink layer 82 is provided at locations on the first ink layer 81 requiring further heightening to obtain the desired height corresponding to the previously determined height differences. Then, the second ink layer 82 is cured. These steps may be repeated to arrive at the desired height, which in the embodiment of FIG. 4D corresponded to seven layers 81-87, while in a practical embodiment the number of layers is dependent on the desired height of the relief layer 8b and the thickness per ink layer. This process of providing a relief structure by application of a printing assembly is known in the art and is therefore not further elucidated herein.

Figure 5A:
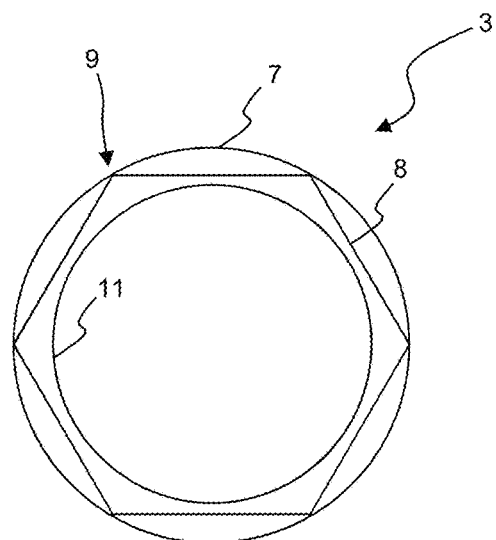
FIG. 5A shows a cross-section of a second embodiment of a circular object generated in accordance with the present invention.

FIG. 5A illustrates another embodiment of a circular three-dimensional object 3. Compared to the embodiment of FIG. 4A, the circular object 3 of FIG. 5A has a circular inner surface 11 instead of the flat polygon faces 8. The circular inner surface 11 may be provided by applying a relief layer not only on an outer surface of the faces 8 of a polygon mesh, but also at an opposite side thereof as illustrated in FIGS. 5B-5D.

Figure 5B:
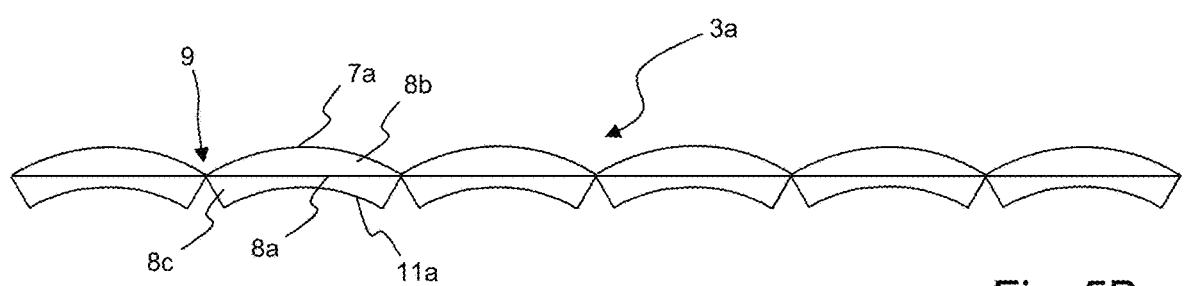
FIG. 5B shows a cross-section of a first embodiment of a polygon mesh suitable for forming the circular object of FIG. 5A.
Figure 5C:
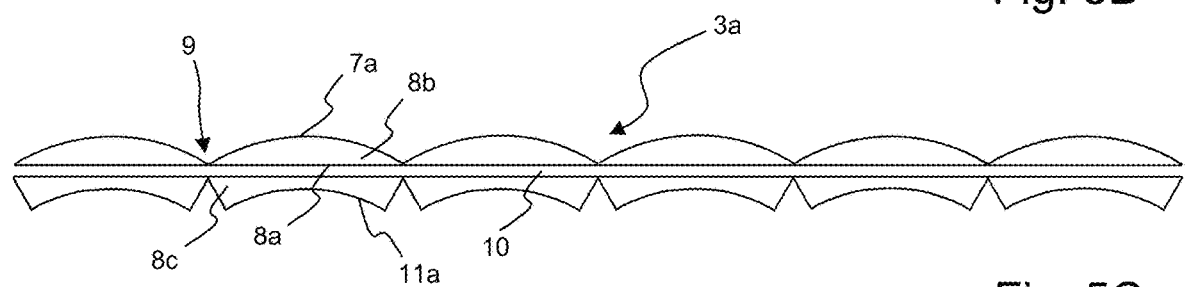
FIG. 5C shows a cross-section of a second embodiment of a polygon mesh suitable for forming the circular object of FIG. 5A.

FIG. 5B shows a polygon mesh 3a comprising flat polygons 8a having an outer relief layer 8b for providing a rounded outer face 7a and an inner relief layer 8c providing a rounded inner face 11a. Similar to the embodiment of FIG. 4B, the polygon mesh 3a with the relief layers 8b, 8c may be completely printed by a printing assembly, provided that the resulting polygon mesh 3a is bendable at the common boundary lines 9. In another embodiment, shown in FIG. 5B, a medium 10 is interposed between the outer relief layer 8b and the inner relief layer 8c.

Figure 5D:
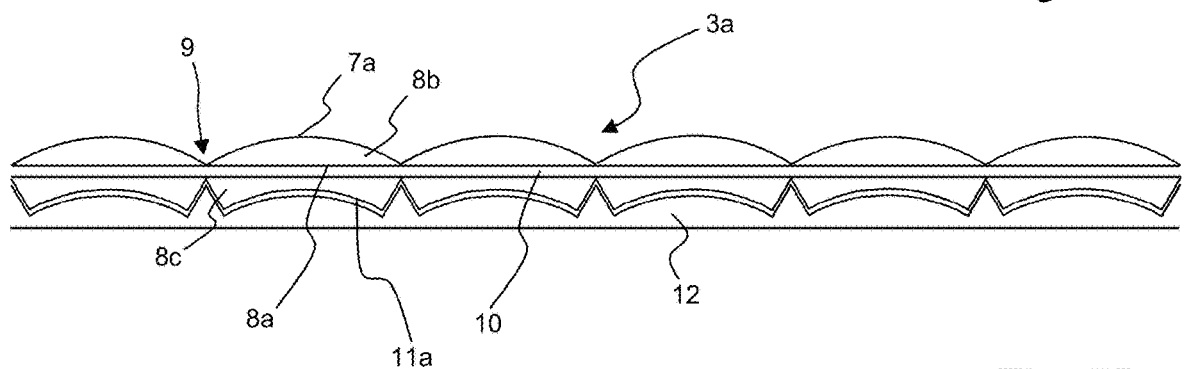
FIG. 5D shows a cross-section of the second embodiment of FIG. 5C arranged on an inverse relief layer.

FIG. 5D illustrates a method for printing a polygon mesh 3a having the outer relief layer 8b and the inner relief layer 8c. The method is illustrated based on the embodiment of FIG. 5C having an interposed medium 10, but the method is as well applicable to the embodiment of FIG. 5B without a medium. Providing the inner relief layer 8c on a flat print surface is hardly—if at all—possible due to the rounded structure having recesses. To enable printing such a structure, an inverse relief layer 12 may be provided on a print surface and the inner relief layer 8c may be obtained by applying the ink layers on the inverse relief layer 12.

The inverse relief layer 12 may be a sacrificial layer that is removed after printing the inner relief layer 8c. For example, a hot-melt material like a wax material may be used. After printing, such an embodiment of the inverse relief layer 12 may be heated and melted in order to be removed. In another embodiment, the inverse relief layer 12 may be a mold, suited for re-use, for example. In such embodiment, the ink layers of the inner relief layer 8c should not adhere to the mold, which may require suitable selection of a material of the mold and/or suitable ink properties. Use of a release agent between the mold and the ink layers may be contemplated as well.

The use of the terms "outer relief layer 8b" and "inner relief layer 8c" should not be considered limiting. The terms "outer" and "inner" are merely used in reference to the exemplary embodiment of FIG. 5A. Two opposing relief layers may be used for other three-dimensional structures as well, in which embodiments, the two relief layers are not required to define an inner surface and an outer surface. Such embodiments are contemplated as well and are also regarded to be covered within the scope of the present invention.

While in the embodiments of FIGS. 4A and 5A the common boundary lines 9 lie at least partly on the outer surface 7 of the three-dimensional object 3, in an embodiment shown in FIG. 6A, the common boundary lines 9 may not lie on the outer surface 7. For example, only corner points of polygons of the ball 1 of FIG. 1A lie on the outer surface 7 (shown in detail in FIG. 3C), while a remainder of the common boundary lines 9 do not lie on the outer surface 7 as shown in detail in FIG. 3D. FIG. 6A illustrates a cross-section of another embodiment of a round three-dimensional object 31, in which cross-section the common boundary lines 9 of the polygon faces 8 do not lie on the outer surface 7. FIG. 6B shows the cross-section of FIG. 6A unfolded. On the left-hand side of FIG. 6B, the dotted lines of the common boundary lines 9 of FIG. 6A are shown, which result in overlapping parts at the common boundary lines 9, which is in practice only possible if the parts are printed separately and are adhered, e.g. glued, together to form the three-dimensional object 31. In another embodiment, the unfolded cross-section 31a is adapted by introducing voids 91 (right-hand side of FIG. 6B), thereby cutting off the relief profile at the common boundary lines 9. Thus, the printed cross-section 31a having a void 91 between each of the relief parts 7a on each polygon face 8a may be folded into a three-dimensional polyhedral 32 as shown in FIG. 6C. At the common boundary lines, the voids 91 are opened forming a v-shaped void 92. These v-shaped voids 92 provide for a deviation from the desired three-dimensional shape 31, but still the polyhedral 32 approximates the three-dimensional shape 31 more closely than without the printed relief parts forming the outer surface 7 on the polygons 8.

FIG. 7 shows an embodiment of a printing assembly 100, having a flat surface as a medium support means 101. On the flat surface a non-flexible flat medium may be arranged and may be printed on. The medium support means 101 is supported on a suitable support structure 102 and a carriage guiding assembly 105 is arranged over the medium support means 101. Such carriage guiding assembly 105 is also known in the art as a gantry. The carriage guiding assembly 105 supports a print head carriage 103 carrying a number of print heads 104 such that the print head carriage 103 is enabled to scan in an Y-direction. The carriage guiding assembly 105 is arranged and configured to be enabled to reciprocate in an X-direction, wherein the Y-direction is usually substantially perpendicular to the X-direction. In a known printing assembly 100, the carriage guiding assembly 105 is also arranged and configured to be enabled to move in a Z-direction, which is substantially perpendicular to the X-direction and the Y-direction such to enable to adapt the printing assembly 14 to a thickness of a recording medium arranged on the medium support surface 101. Similarly, the movement in the Z-direction allows forming a thick layer or relief layer as used in the present invention.

It is noted that the printing assembly 100 as shown in FIG. 7 is a mere exemplary printing assembly for use with the present invention. The present invention is not limited to a printing assembly as shown in FIG. 7. The present invention may be executed using with any suitable kind of printing assembly.

Figure 8:
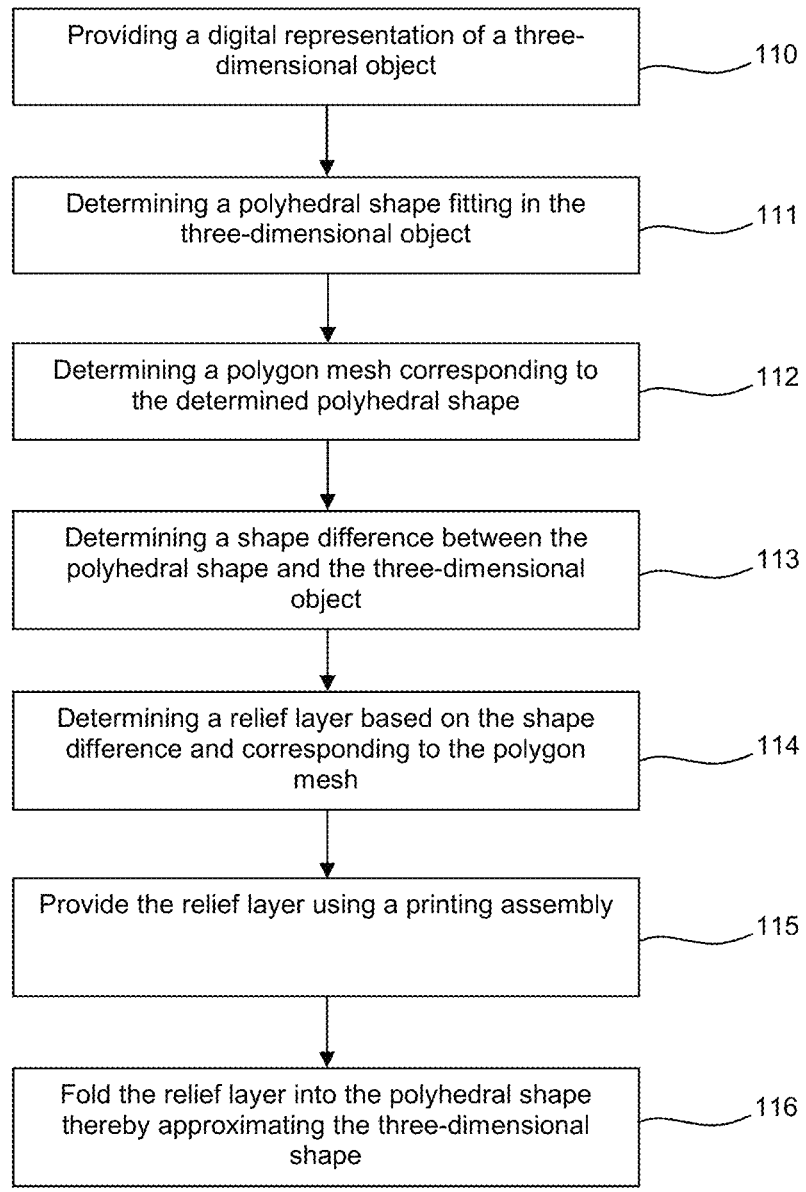
FIG. 8 shows a workflow diagram describing the method according to the present invention.

FIG. 8 shows a diagram for illustrating an embodiment of the method according to the present invention. In the illustrated embodiment, the method starts with a step 110 of providing a digital representation of a three-dimensional object. The digital representation is a computer-readable file, or the like, enabling a computer to handle and operate on the representation. The three-dimensional object is the object that is desired to be printed.

In a subsequent step 111, preferably a computer or otherwise a human operator determines a suitable polyhedral shape approximating the desired three-dimensional object. In view of the added manufacturing step of applying a relief layer, the polyhedral shape fits preferably completely within the desired three-dimensional object. Further, depending on the desired smoothness and approximation, a small number of polygons or a larger number of polygons may be selected as illustrated in FIGS. 2A-2C, bearing in mind that increasing the number of polygons may result in more complexity and computing power.

Having selected the polyhedral shape, the polyhedral shape is virtually unfolded into a corresponding polygon mesh in step 112. The polygon mesh may have all polygons of the polyhedral directly or indirectly connected as illustrated in FIG. 1D for the polyhedral 2 of FIG. 1B or the polygons may be separated into individual parts of one or more polygons. In the latter embodiment, such parts may be adhered, e.g. glued, together when forming the polyhedral shape from the polygon mesh after printing (step 116 as discussed hereinafter).

Based on the polyhedral and its corresponding polygon mesh, a difference in outer surface of the polyhedral and the three-dimensional is determined in step 113 and such difference is translated into a relief layer to be applied to the polygon mesh in step 114. The relief layer may then be provided by a printing assembly in step 115. The relief layer may be applied on a suitable medium such as a foil or a paper-like medium sheet or may be formed on the medium support surface to form a separate foldable element formed from the ink supplied by the printing assembly.

As a last step 116, the printed polygon mesh is folded and, where applicable, adhered to form the polyhedral having a relief layer on its polygon faces to approximate the desired three-dimensional object.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, such a reference to a structural element encompasses a computer readable medium carrying such computer executable instructions.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for providing a three-dimensional object, the method comprising the steps of:
   providing a representation of the three-dimensional object;
   determining a polygon mesh of a polyhedral resembling the object, wherein the polyhedral fits within the object;
   determining a surface difference between an outer surface of the object and an outer surface of the polyhedral;
   defining a relief layer corresponding to the polygon mesh based on said surface difference;
   instructing a printing assembly to provide the relief layer; and
   folding the relief layer in accordance with the polygon mesh to form the polyhedral resembling the three-dimensional object.

2. The method according to claim 1, wherein the polygon mesh comprises a first polygon and a second polygon, wherein the second polygon is adjacent to the first polygon such that the first polygon and the second polygon have a common boundary line and wherein the relief layer is defined taking into account the common boundary line between the first polygon and the second polygon such to enable folding of the relief layer along the common boundary line.

3. The method according to claim 2, wherein a void is provided in the relief layer at a position of the common boundary line.

4. The method according to claim 2, wherein the polygon mesh is determined to have the common boundary line on the outer surface of the three-dimensional object.

5. The method according to claim 1, wherein the step of instructing the printing assembly comprises generating a multi-layer print data set, wherein the multi-layer print data set comprises print data for printing multiple layers, wherein the multiple layers form the relief layer.

6. The method according to claim 1, wherein the method further comprises the steps of:
defining an inverse relief layer based on the relief layer and said surface difference;
instructing the printing assembly to first provide the inverse relief layer and to provide the relief layer on the inverse relief layer; and
removing the inverse relief layer to obtain the relief layer.

7. The method according to claim 1, wherein the method further comprises a step of providing a foldable medium in the printing assembly for providing the relief layer on the medium and wherein the step of folding the relief layer comprises folding the medium with the relief layer.

8. The method according to claim 7, wherein the method comprises cutting the medium in accordance with a circumference of the polygon mesh.

9. A printing control unit comprising a processor and a processor-readable medium comprising a set of processor-executable instructions, the set of processor-executable instructions comprising instructions for the processor to:
receive a representation of a three-dimensional object;
determine a polygon mesh of a polyhedral resembling the three-dimensional object, wherein the polyhedral fits within the three-dimensional object;
determine a surface difference between an outer surface of the three-dimensional object and an outer surface of the polyhedral; and
define a relief layer corresponding to the polygon mesh based on the surface difference; and
instructing a printing assembly to fold the relief layer in accordance with the polygon mesh to form the polyhedral resembling the three-dimensional object.

10. A printing assembly for providing a three-dimensional object, wherein the printing assembly comprises a printing device configured for providing a recording substance on a print surface in multiple layers and wherein the printing assembly comprises the printing control unit according to claim 9, the printing control unit further being configured to
generate a multi-layer print data set, wherein the multi-layer print data set comprises print data for printing multiple layers, wherein the multiple layers form the relief layer; and
instruct the printing device to provide the relief layer by printing the multiple layers defined by the multi-layer data set.

11. The method according to claim 1, wherein the relief layer has a thickness corresponding to said surface difference.

* * * * *